HENRY CARPENTER.

Improvement in Fruit Baskets.

No. 4,982. Reissued July 16, 1872.

Witnesses:

A. W. Almqvist

Francis. M. Ardt.

Inventor:

Henry Carpenter.

PER

Attorneys.

AM. PHOTO-LITHOGRAPHIC CO. N.Y. (OSBORNE'S PROCESS.)

UNITED STATES PATENT OFFICE.

HENRY CARPENTER, OF WILLIAMSBURG, NEW YORK.

IMPROVEMENT IN FRUIT-BASKETS.

Specification forming part of Letters Patent No. 120,620, dated November 7, 1871; reissue No. 4,982, dated July 16, 1872.

*To all whom it may concern:*

Be it known that I, HENRY CARPENTER, of Williamsburg, in the county of Kings and State of New York, have invented certain Improvements in Fruit-Baskets; and I do hereby declare that the following is a full, clear, and exact description thereof, which will enable others skilled in the art to make and use the invention, reference being had to the accompanying drawing forming a part of this specification, in which—

Figure 1:
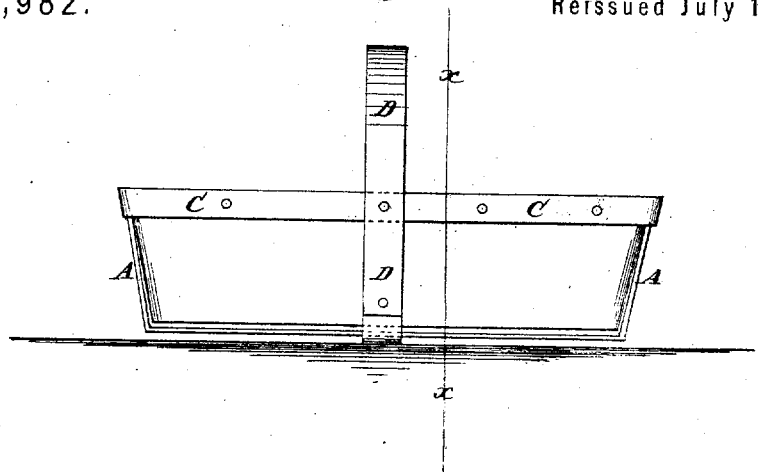
Figure 2:
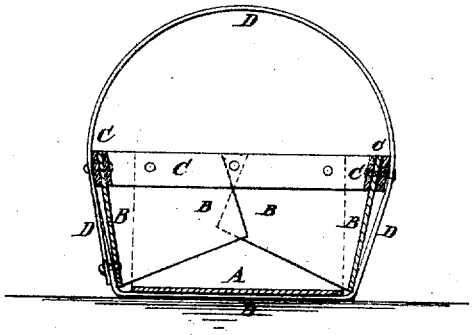

Figure 1 is a side view of a basket constructed in accordance with my invention. Fig. 2 is a cross-section of the same taken at the line *x x* in Fig. 1.

Similar letters of reference indicate corresponding parts.

The general object of this invention is to furnish an improved fruit-basket for sending fruit to market, for use upon stands, to enable the purchaser to carry away his fruit conveniently and safely, and which may be used for various other purposes; and it consists in a basket embracing certain advantageous peculiarities of construction, substantially as hereinafter described.

In the basket represented in the drawing, A is the bottom strip, which is made of the desired width of said basket. The end parts of the strip A are bent upward to form the ends of the baskets. B B are two strips that form the sides of the basket. Said strips B are made as wide as the desired height of the basket, and their end parts, which are cut obliquely, are bent inward to overlap one another against the turned-up end parts of the strip A. By thus forming the sides of a basket of two strips, B B, with obliquely-cut and overlapping ends, the body of the basket while retaining a straight upper edge is made of a flaring form to provide for the close packing of a number of baskets one within the other—that is, when the handle, if one be used, be attached to admit of the same. The upper edge of the basket may be strengthened, and the bent end part of the strips A B secured in place by two bands, C, placed the one upon the outer and the other upon the inner sides of said edge. D is a handle, which is passed entireiy around the sides and the bottom of the basket, and its ends are overlapped and secured to each other and the basket, as shown in Figs. 1 and 2, so as not only to serve as a handle, but also to serve as a band to support the middle parts of the strips A B, and thus strengthen the basket. The union of the parts or any of them is secured by tacks; thus the bands C are tacked to each other and to the upper edge of the basket, as shown.

In the case of long baskets, bands may be passed around it from edge to edge to strengthen the strips A B in the same manner as the lower parts of the handle D strengthen them.

Having thus described my invention, I claim as new and desire to secure by Letters Patent—

1. A basket formed of three strips, A B B, strengthened in its middle part by the strip or handle D, extended around the sides and bottom of said basket, substantially as herein shown and described.

2. The strengthening band or bands C at the upper edge of the basket, with or without additional bands, in combination with the three strips A B B composing the body of the basket, and the handle D formed of a strip arranged to brace the sides and bottom of the basket, essentially as herein described.

HENRY CARPENTER.

Witnesses:

FRED. HAYNES,

R. E. RABEAU.